United States Patent
Walters et al.

(10) Patent No.: US 11,588,775 B2
(45) Date of Patent: Feb. 21, 2023

(54) METHODS AND SYSTEMS FOR USING MACHINE LEARNING TO DETERMINE TIMES TO SEND MESSAGE NOTIFICATIONS

(71) Applicant: Capital One Services, LLC, McLean, VA (US)

(72) Inventors: Austin Walters, McLean, VA (US); Jeremy Goodsitt, McLean, VA (US); Galen Rafferty, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/319,796

(22) Filed: May 13, 2021

(65) Prior Publication Data
US 2022/0368665 A1  Nov. 17, 2022

(51) Int. Cl.
*G06F 15/16* (2006.01)
*H04L 51/224* (2022.01)
*H04L 51/02* (2022.01)
*G06F 40/30* (2020.01)

(52) U.S. Cl.
CPC ........... *H04L 51/224* (2022.05); *G06F 40/30* (2020.01); *H04L 51/02* (2013.01)

(58) Field of Classification Search
CPC ...................................... H04L 51/224
USPC ............................................. 709/206
See application file for complete search history.

(56) References Cited

U.S. PATENT DOCUMENTS

| | | | |
|---|---|---|---|
| 2018/0248829 A1* | 8/2018 | Hardee | H04L 51/214 |
| 2018/0253659 A1* | 9/2018 | Lee | H04L 51/42 |
| 2020/0145363 A1* | 5/2020 | Carteri | H04L 51/224 |
| 2020/0274842 A1* | 8/2020 | Delaney | H04L 51/226 |
| 2021/0044547 A1* | 2/2021 | Bradley | G06F 40/30 |
| 2021/0383251 A1* | 12/2021 | Osborn | G06N 20/00 |

* cited by examiner

*Primary Examiner* — Hee Soo Kim
(74) *Attorney, Agent, or Firm* — Perkins Coie LLP

(57) ABSTRACT

Methods and systems are disclosed herein for using machine learning to send notifications. A computer system may receive a message and may determine a sentiment level and/or an urgency level associated with the message. The computer system may use the sentiment level and/or urgency level to predict when the user will respond to the message. The computer system may compare the predicted response time with one or more thresholds to determine a time to send a notification for the message to the user device.

18 Claims, 7 Drawing Sheets

| Threshold ID | Threshold | Rule |
|---|---|---|
| 221 | Predicted response time is less than four hours | Send as soon as possible |
| 222 | Predicted response time is more than four hours and less than twenty four hours | Send next when user is next available |
| 223 | Predicted response time is more than twenty four hours | Send at close of business |

From: Jane Doe
Time/Date: 8:30pm 03.12.2021

304

Hey you have been assigned to a new project. Please follow the attached instructions and submit by Wednesday close of business

306

How did this make you feel?

| Bad | Neutral | Good |

FIG. 3

| Message ID | Text | Timestamp | Urgency | Sentiment | Predicted Response Time |
|---|---|---|---|---|---|
| 421 | We are pleased to inform you that you've been selected for promotion | 3:03PM 03.22.2021 | Medium | happy | 3:33PM 03.22.2021 |
| 422 | This really needs a lot of work. Why did you send this so late?!? | 10:05AM 02.26.2021 | High | angry | 10:15AM 02.26.2021 |
| 423 | Let's get lunch today? | 11:06AM 03.07.2021 | High | neutral | 11:21AM 03.07.2021 |
| 424 | Could you please read this and let me know what you think? | 10:08AM 06.05.2021 | Low | neutral | 12:03AM 06.16.2021 |

FIG. 4B

METHODS AND SYSTEMS FOR USING MACHINE LEARNING TO DETERMINE TIMES TO SEND MESSAGE NOTIFICATIONS

BACKGROUND

In the last few years carrying a mobile computing device (e.g., smart phones, tablets, and others) has become a common practice among many people. These devices enable users to have quick and easy access to a variety of applications, including email, instant messaging, social media, and others. At the same token, those applications have gained the power to "notify" the user from the application at almost any time, sometimes even at times that are not convenient or not wanted. Thus, users of these mobile devices are often bombarded with many notifications. Due to a sheer volume of notifications, a user may miss notifications, for example, because the user may start ignoring notifications until an appropriate time. In addition, the user may have difficulty determining which notifications are important while reviewing the plethora of the notification that are shown on the mobile device. Furthermore, vast numbers of notifications may make using these mobile devices inefficient. For example, the user may receive too many notifications in a short period of time and may be unable to respond to the notifications in a timely manner. This creates the need for additional notifications to be sent later (e.g., reminder notifications), which may use up additional computing resources and/or the time of other users. It may be difficult to determine when to send a notification to a user.

Additionally, notifications create problems because users may receive notifications during stressful or difficult times, which may compound their stress. Notifications received at the wrong time may lead to the user responding to the notification in an undesired manner. For example, if a user receives an angry email when the user is in an angry mood, the user may respond in an angry manner, which the user may regret at a later time. It may be difficult to determine a time to send a notification to a user that enables the user to respond to a message in a desired manner.

SUMMARY

To address these and other issues, one or more machine learning models may be used to predict when a notification should be sent to a user device. One or more models may use a message and/or other information as input to generate output. For example, the output may be based on who the message is from, what time the message was sent, the sentiment of the message, how quickly a user associated with the user device typically responds to the type of message (e.g., the urgency of the message), the user's schedule, mood, and/or other information. The output may be used to determine a time to present a notification to a user. For example, the output may be used to determine that a notification for a message that is from a user's manager should be presented to the user immediately because the user typically responds quickly to the manager. As an additional example, a system may determine that a message is likely one that the user will respond to a few days after receiving the message and/or notification for the message. A computing device may present a notification for the message or messages of a similar type at a convenient/preferred time. A machine learning model may be used to make these determinations. Using a machine learning model to determine a time to present a notification may improve efficiency of message processing on mobile devices because it may increase the effectiveness of notifications and thereby reduce the need to send reminder notifications, which require additional computer resources (e.g., network bandwidth, processing time, etc.). Furthermore, using a machine learning model to determine a time to send a notification may prevent distractions from the users (e.g., because unimportant notifications are not sent when the user is busy), thus improving user experience.

A computing device may receive a message and may be tasked with generating and providing a notification for the message at a time predicted to alleviate the problems discussed above. The message may include text and metadata indicating a sender of the message, the user intended to receive the message, and/or a timestamp (e.g., indicating when the message was sent or when the message was received by the computing device). For example, the message may be an email from a colleague and may indicate that the colleague would like the user to review a thirty-page document that is attached to the email. The computing device may generate, via a message embedding model, a vector representation of the message. The vector representation may be indicative of the text and the metadata of the message. For example, a vector representation of the email may be generated using the embedding model based on the text in the email, the sender, the recipient, and/or other metadata. The computing device may input the vector representation into a sentiment detection model to obtain a sentiment identifier associated with the message. For example, the computing device may use the sentiment detection model to generate a sentiment identifier for the email (e.g., the email with the thirty-page attachment may have a neutral sentiment identifier). Additionally or alternatively, the computing device may input the vector representation into an urgency detection model to obtain an urgency level associated with the message. For example, the urgency detection model may determine that the email is not urgent based on the vector representation of the email (e.g., because the message did not indicate a due date). The computing device may input an indication of the sentiment identifier, the urgency level, the timestamp, and/or user device information into a response prediction model to obtain a predicted response time for the message. The response time may be the amount of time that the user is predicted to take before responding to the message. For example, the computing device may use the response prediction model to predict that the user will respond to the message in one week (e.g., because the user will need to review a document before responding, and/or because the user has taken one week to respond to similar emails with similar attachments in the past, etc.). The computing device may compare the predicted response time with one or more thresholds to determine a time to send a notification for the message to the user device. For example, the predicted response time for the email may be one week and there may be a threshold indicating that if it is predicted that it will take the user more than one day to respond, the notification should be sent in the morning the following business day. The computing device may send the notification to the user device based on the determined time (e.g., the email notification may be sent the next business day at 8:00 am).

The user may be able to provide feedback to adjust when notifications are sent. The computing device may receive feedback indicating a preferred time for receiving the message notification and a second sentiment identifier of the message indicating an interpretation of the message by the user. For example, a user may be prompted for feedback after receiving the email notification and the user may indicate a better time for the notification to be sent or may indicate how the email made the user feel (e.g., the user's interpreted sentiment of the email). The computing device or one or more other computing devices may train, based on the feedback, one or more models to improve future predictions.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," an, and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 shows a table with example thresholds for determining when to send a notification, in accordance with some embodiments.

FIG. 3 shows an example user interface for enabling a user to provide feedback, in accordance with some embodiments.

FIG. 4B shows a table with example data that may be used to train one or more machine learning models, in accordance with some embodiments.

DETAILED DESCRIPTION OF THE DRAWINGS

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
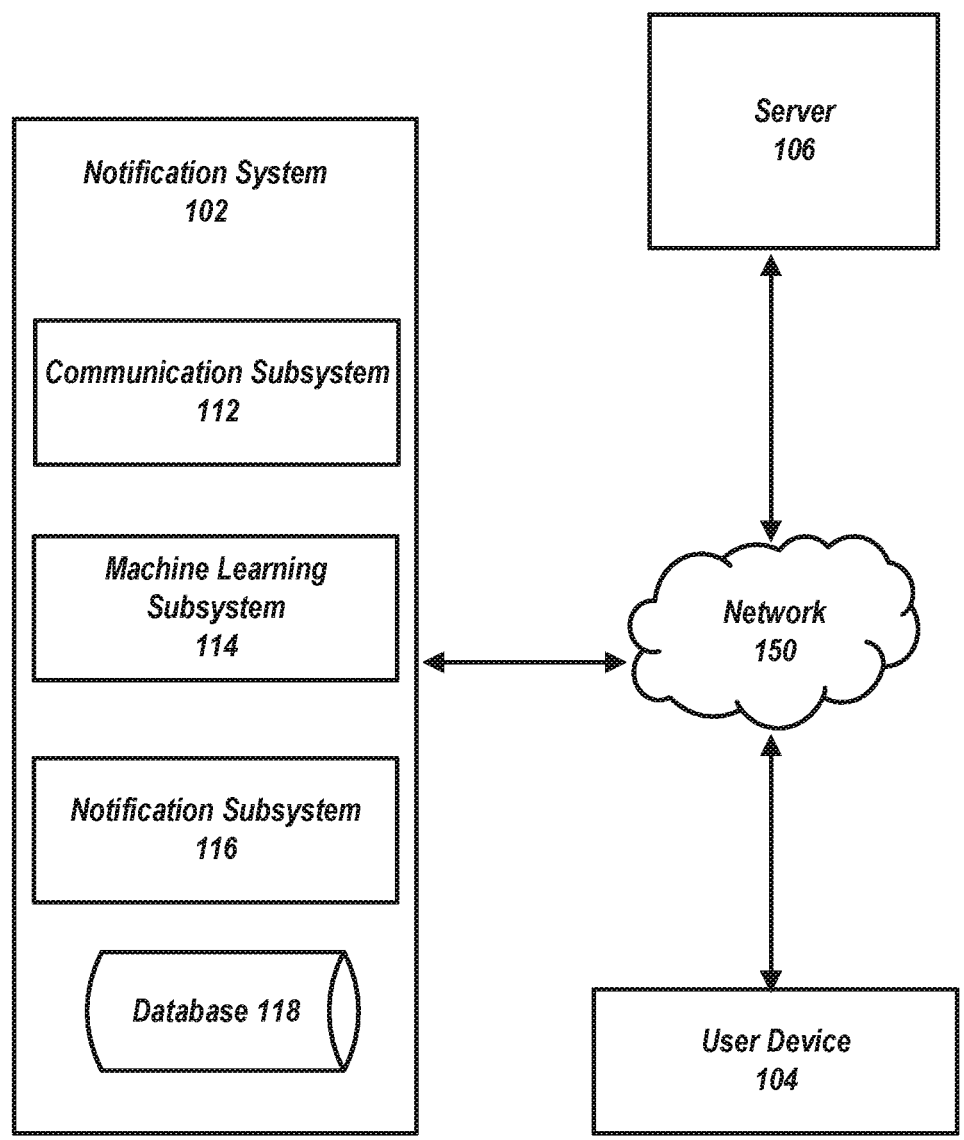
FIG. 1 shows an example notification system for using machine learning for notifications, in accordance with some embodiments.

FIG. 1 shows an example computing system 100 for using one or more machine learning models to determine when to provide a notification (e.g., for a received message). One or more machine learning models may be used by the computing system 100 to predict when a notification should be provided to a user. The one or more models may take as input any information associated with a message to generate output. The output may be used to determine a time to provide the notification to a user. For example, the output may be used to determine that a notification for a newsletter should be presented to the user at the end of the day, to avoid distracting the user. Using machine learning to determine a time to present a notification may improve the efficiency of one or more computing systems because the notifications may be more effective, thus reducing the need to send and/or display reminder notifications which may require additional computer resources (e.g., network bandwidth, processing time, etc.). Using machine learning to determine a time to send and/or display a notification may also prevent distraction of users and may enable a user to send better responses (e.g., because notifications may be avoided when the user is likely to respond with a message that has a negative sentiment). For example, if a user has previously responded with an angry message after receiving a notification after 8pm on a Friday, the computer system may avoid sending and/or displaying notifications for future messages after 8 pm on Fridays.

The computing system 100 may receive a message and may be tasked with generating and providing a notification for the message. For example, the message may be an invitation to get lunch in two hours. The computing system 100 may input the message into a machine learning model to obtain a predicted response time for the message. The response time may be the amount of time that the user is predicted to take before responding to the message. For example, the computing system 100 may use the machine learning model to predict that the user will respond to the message in less than one hour (e.g., because the message is associated with an event that is happening in less than a threshold amount of time, and/or because the user has taken less than one hour to respond to similar emails in the past, etc.). The computing system 100 may compare the predicted response time with one or more thresholds to determine a time to provide a notification for the message to the user device. For example, the predicted response time for the email may be less than one hour. A threshold may indicate that notifications for messages associated with response times that are less than one hour should be sent immediately. The computing system 100 may provide the notification to the user device based on the determined time (e.g., the notification for the invitation message may be sent as soon as the computer system is able to provide it). The computing system 100 may train one or more models to improve future predictions (e.g., to generate more accurate predictions) based on feedback from the user. For example, if the user receives a distracting text message, the user may be able to provide feedback that causes future text messages (e.g., that are determined to be similar to the distracting text message via a machine learning model) to be sent when the user is not at work.

The system 100 may include a notification system 102, a user device 104, and/or a server 106. The notification system 102 may include a communication subsystem 112, a machine learning (ML) subsystem 114, a notification subsystem 116, and/or a database 118. The communication subsystem 112 may receive a message from the server 106. The message may include text and/or metadata associated with the message. For example, the metadata may indicate a user device or user that sent the message, the user and/or user device that is intended to receive the message, and/or a timestamp (e.g., indicating when the message was sent or when the message was received by the notification system 102). A person skilled in the art would understand that notification system 102 may reside on its own device or be hosted on a server 106 or user device 104. In some embodiments, notification system 102 may have some components hosted on server 106 and some components on user device 104.

The ML subsystem 114 may generate a vector representation of the message received by the communication subsystem 112. The vector representation may be generated using a message embedding model. The message embedding model may be trained (e.g., as discussed in more detail below in connection with FIGS. 4A-4B) to map similar messages to similar vectors vectors that are within a threshold cosine distance from each other). The vector representation may be indicative of the text and/or the metadata of the message. For example, messages with similar semantic meaning that are sent from the same user may be mapped to similar vector representations.

The ML subsystem 114 may input the vector representation of the message into a sentiment detection model to obtain a sentiment identifier associated with the message. The sentiment detection model may output a sentiment identifier for the input message. For example, the sentiment identifier may indicate that the message is happy, sad, angry, frustrated, nervous, neutral, negative, positive, excited, etc. The sentiment detection model may be a machine learning model, for example, as discussed below in connection with FIGS. 4A-4B. The sentiment detection model and the message embedding model may be the same machine learning model or may be separate machine learning models.

Additionally or alternatively, the ML subsystem 114 may input the vector representation into an urgency detection model to obtain an urgency level associated with the message. The urgency detection model may use the vector representation of the message and/or metadata associated with the message to generate the urgency level. The urgency detection model may output a value (e.g., a number between 1 and 10) that indicates the level of urgency of the message. In some embodiments, higher values may indicate more urgent messages. For example, on a scale between 1 and 10, a value of 1.4 may indicate that the message is not urgent, and a value of 9.3 may indicate that the message is very urgent. The urgency detection model may be a machine learning model, for example, as discussed below in connection with FIGS. 4A-4B. The urgency detection model, the sentiment detection model, and/or the message embedding model may be the same machine learning model or may be separate machine learning models.

The ML subsystem 114 may input an indication of the sentiment identifier, the urgency level, and/or the timestamp, into a response prediction model to obtain a predicted response time for the message. The predicted response time may indicate a quantity of time predicted to transpire between a first time at which the notification is presented to the user and a second time at which a response is predicted to be sent to the message. For example, if the ML subsystem 114 predicts that the user will take one week to respond to an email after receiving the notification for the email, the predicted response time may be one week. Additionally or alternatively, the ML subsystem 114 may use user information (e.g., user information of the intended recipient of the message and/or user information of the user that sent the message) as input into the response prediction model to generate the urgency level. For example, user information may include an indication of the user's supervisor, an indication of the user's schedule (e.g., what time the user is busy, what time the user is available, etc.), and/or an indication of the user's preferences (e.g., subjects that the user has deemed urgent, a sender that the user has deemed needs a quick response, etc.).

The notification subsystem 116 may determine a time to provide a notification for the message to the user device 104. The notification subsystem 116 may determine the time based on a comparison of the predicted response time one or more thresholds. Each threshold may be associated with a rule for providing the notification based on the predicted response time. For example, if a first threshold is satisfied by the predicted response time, a first rule associated with the first threshold may be used to determine when to provide the notification. Referring to FIG. 2, a table 200 with example thresholds and their associated rules is shown. The table 200 includes a column for threshold IDs 203, a column for thresholds 206, and a column for rules 209. As an example, threshold 221 may indicate that if the predicted response time is less than four hours, the notification should be sent as soon as possible. As an additional example, the threshold 222 may indicate that if the predicted response time is more than four hours and less than twenty-four hours, the notification should be sent the next time the user is available (e.g., as indicated in the user's calendar, or by other information). As an additional example, threshold 223 may indicate that if the predicted response time is more than twenty-four hours (e.g., the user will take longer than a day to respond to the message associated with the notification), the notification should be sent at or just before the close of business (e.g., 4:30 pm, 5 pm, 6 pm, etc.).

In some embodiments the notification subsystem 116 may provide the notification based on user preferences. Based on a determination that the predicted response time fails to satisfy a threshold time the message is not urgent, the user is not predicted to respond for more than 24 hours, etc.), the notification subsystem 116 may determine the time to provide the message notification based on a user preference. The user preference indicates a time at which non-urgent message notifications should be sent. For example, the user preference may indicate that messages that the user is not predicted to respond to for over a week, should be sent on the following Saturday.

In some embodiments, the notification subsystem 116 may determine to provide the notification at a time when the user is predicted to send a response with a target sentiment. For example, the notification subsystem 116 may determine to avoid providing a notification before 9:00 am because the user has previously sent responses associated with an angry sentiment identifier when notifications for similar messages were sent before 9:00 am. As an additional example, the notification subsystem 116 may determine to provide a notification during a lunch break because the notification system 102 has determined that notifications for similar messages have distracted (e.g., stopped the user from working for longer than a threshold period of time) the user in the past. The notification subsystem 116 may use a machine learning model (e.g., as discussed in connection with FIGS. 4A-4B) to determine when to provide a notification so that a target sentiment of a response may be achieved. The notification subsystem 116 may determine, for a first time period (e.g., between 1 pm and 3 pm), a first sentiment identifier predicted to correspond to a response from the user device, if the notification is sent during the first time period. For example, the notification subsystem 116 may use a machine learning model to determine that there is an increased likelihood that a user will send a happy response, if a notification is received at a particular time. Based on a determination that the sentiment identifier matches a target sentiment identifier (e.g., the predicted sentiment identifier of the response is happy, positive, kind, etc.), the notification subsystem 116 may determine the time to provide the message notification based on the first time period (e.g., between 1 pm and 3 pm).

The communication subsystem 112 may provide the notification to the user device 104 (e.g., the user device associated with the user that is the intended recipient of the message). The communication subsystem 112 may provide the notification based on the time determined by the notification subsystem 116 (e.g., at the time determined by the notification subsystem 116).

The communication subsystem 112 may receive, from the user device and/or the user, feedback information that may be used to improve response time predictions. The feedback may be used, for example, to adjust (e.g., train) the sentiment detection model, the urgency detection model, the embedding model, and/or the response prediction model. The feedback information may indicate a preferred time for receiving the message notification. For example, the user may indicate, via the user device, that the notification should have been sent earlier, later, or at a time specified by the user (e.g., during a lunch break, after 5 pm, on the weekend, etc.). The preferred time may be inferred by the notification system 102. For example, if the user has responded to notifications for similar messages within a threshold time (e.g., 1 hour), then the notification system 102 may determine that the preferred time for the notification is as soon as the system 102 can provide the notification. If the user has taken more than a threshold time (e.g., more than four hours) to respond to similar messages in the past, then the system 102 may determine that the preferred time for the notification is at the end of the day (e.g., 10:00 pm). The feedback information may include a second sentiment identifier of the message that, indicates an interpretation of the message by the user. The user may indicate, via the user device, the user's perceived sentiment of the message. Referring to FIG. 3, an example user interface (UI) 300 for providing feedback information is shown. The UI may include a UI element 302 indicating who a message was from and the time the message was received, a UI element 304 indicating the text of the message, and a UI element 306 that allows a user to provide feedback information about the sentiment of the message. For example, the UI element 306 may prompt the user to select one of several sentiment options such as bad, neutral, or good.

In some embodiments, the feedback information may be implicit. For example, the notification system 102 may use the actual response time of the user as the feedback information. The notification system 102 may store the actual response times, the associated message(s), and/or metadata of the message(s) in the database 118 and may use them to generate training data for training the response prediction model or any other model discussed above (e.g., as discussed below in connection with FIGS. 4A-4B. The ML subsystem 114 may train, based on the feedback information, the sentiment detection model, the urgency detection model, and/or the response prediction model (e.g., as described in more detail below in connection with FIG. 2).

The user device 104 may be any computing device, including, but not limited to, a laptop computer, a tablet computer, a hand-held computer, smartphone, other computer equipment (e.g., a server or virtual server), including "smart," wireless, wearable, and/or mobile devices. The user device may be configured to receive notifications from the notification system 102. the notification may be received and displayed on the user device in any manner that is known to those skilled in the art. For example, the notification may be displayed on a smart phone, in a desktop banner, as an icon on a user interface, or any other manner. Although only one client device 104 is shown, the system 100 may include any number of client devices, which may be configured to receive notifications from the notification system 102 via the network 150.

The notification system 102 may include one or more computing devices described above and/or may include any type of mobile terminal, fixed terminal, or other device. For example, the notification system 102 may be implemented as a cloud computing system and may feature one or more component devices. A person skilled in the art would understand that system 100 is not limited to the devices shown in FIG. 1. Users may, for example, utilize one or more other devices to interact with devices, one or more servers, or other components of system 100. A person skilled in the art would also understand that while one or more operations are described herein as being performed by particular components of the system 100, those operations may, in some embodiments, be performed by other components of the system 100. As an example, while one or more operations are described herein as being performed by components of the notification system 102, those operations may be performed by components of the client device 104, and/or server 106. In some embodiments, the various computers and systems described herein may include one or more computing devices that are programmed to perform the described functions. Additionally or alternatively, multiple users may interact with system 100 and/or one or more components of system 100. For example, a first user and a second user may interact with the notification system 102 using two different client devices.

In some embodiments, the notification system 102 may be part of the user device 104. The user device 104 may determine when to provide and/or display a notification to a user as described in more detail in connection with FIGS. 1-6). Providing a notification may include outputting a sound, displaying an element in a user interface, vibrating the user device 104, sending information to the user device 104 (e.g., that causes the user device 104 to display a notification), or any other way of providing a notification that may be known to a person of ordinary skill in the art. In some embodiments, the notification system 102 and the user device 104 may be separate devices and providing a notification may include sending, by the notification system 102, the notification to the user device 104.

One or more components of the notification system 102, client device 104, and/or server 106, may receive content and/or data via input/output (hereinafter "I/O") paths. The one or more components of the notification system 102, the client device 104, and/or the server 106 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the notification system 102, the client device 104, and/or the server 106 may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to using machine learning to determine when notifications should be sent.

One or more components and/or devices in the system 100 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes a network 150. The network 150 may be the Internet, a mobile phone network, a mobile voice or data network (e.g., a 5G or LTE network), a cable network, a public switched telephone network, a combination of these networks, or other types of communications networks or combinations of communications networks. The devices in FIG. 1 (e.g., notification system 102, the client device 104, and/or the server 106) may communicate (e.g., with each other or other computing systems not shown in FIG. 1) via the network 150 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 1 may include additional communication paths linking hardware, software, and/or firmware components operating together. For example, the notification system 102, any component of the notification system (e.g., the communication subsystem 112, the ML subsystem 114, the notification subsystem 116, and/or the database 118), the client device 104, and/or the server 106 may be implemented by one or more computing platforms.

Figure 4A:
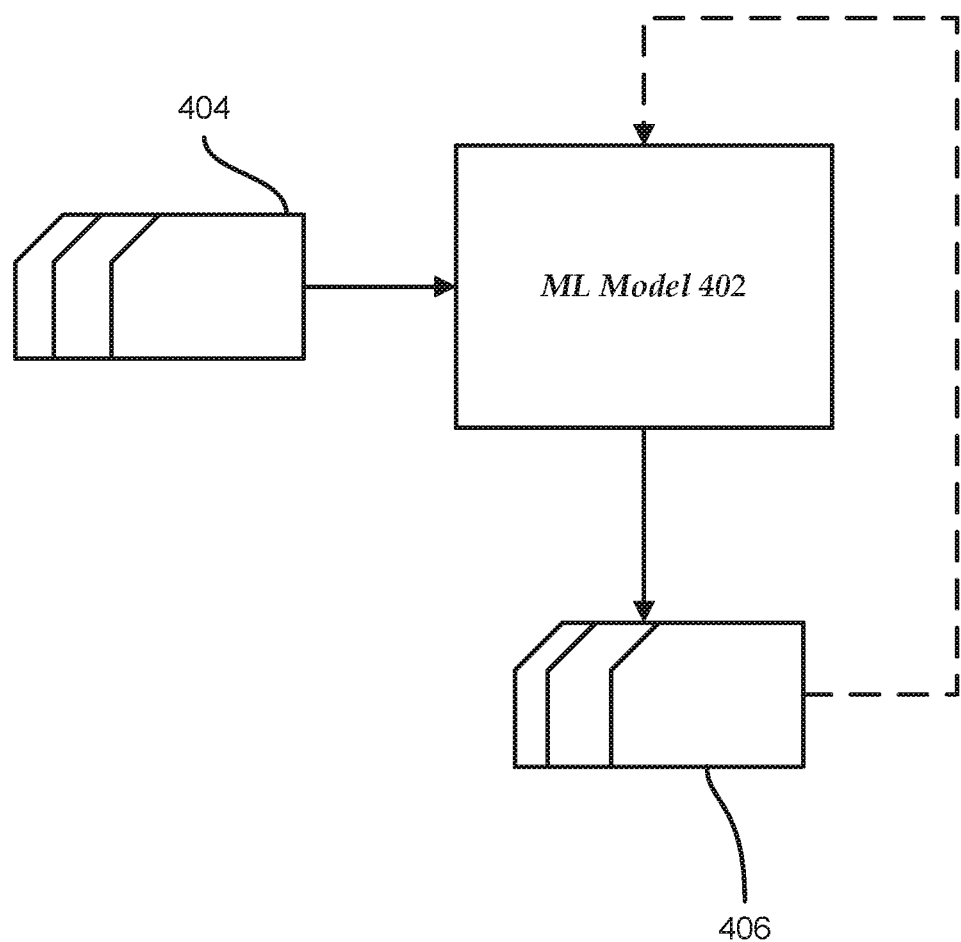
FIG. 4A shows an example machine learning model, in accordance with some embodiments.

The embedding model, the sentiment detection model, the urgency detection model, and/or the response prediction model may be implemented as one or more machine learning models, for example, as shown in FIG. 4A. With respect to FIG. 4A, machine learning model 402 may take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate results (e.g., response time predictions, sentiment identifiers, urgency levels, etc.) with better recall and/or precision.

In some embodiments, the machine learning model 402 may include an artificial neural network. In such embodiments, machine learning model 402 may include an input layer and one or more hidden layers. Each neural unit of the machine learning model may be connected with one or more other neural units of the machine learning model 402. Such connections can be enforcing or inhibitory in their effect on the activation state of connected neural units. Each individual neural unit may have a summation function which combines the values of all of its inputs together. Each connection (or the neural unit itself) may have a threshold function that a signal must surpass before it propagates to other neural units. The machine learning model 402 may be self-learning and/or trained, rather than explicitly programmed, and may perform significantly better in certain areas of problem solving, as compared to computer programs that do not use machine learning. During training, an output layer of the machine learning model 402 may correspond to a classification, and an input known to correspond to that classification may be input into an input layer of machine learning model during training. During testing, an input without a known classification may be input into the input layer, and a determined classification may be output. For example, the classification may be a sentiment identifier of a message (e.g., happy, angry, exciting, negative, positive, neutral, etc.), an urgency level (e.g., low, medium, high, etc.), or a predicted response time (e.g., the user is predicted to respond in less than 24 hours, the user is predicted to respond in more than 24 hours, etc.). The machine learning model 402 trained by the machine learning subsystem 114 may include one or more embedding layers at which a message is converted into one or more vector representations (e.g., the vector representation of the message as discussed above). The one or more vector representations of the message may be pooled at one or more subsequent layers to convert the one or more vector representations into a single vector representation.

The machine learning model 402 may be structured as a factorization machine model. The machine learning model 402 may be a non-linear model and/or supervised learning model that can perform classification and/or regression. For example, the machine learning model 402 may be a general-purpose supervised learning algorithm that the system uses for both classification and regression tasks. Alternatively, the machine learning model 402 may include a Bayesian model configured to perform variational inference, for example, to predict response time as described above.

Referring to FIG. 4B, an example portion of a dataset 450 that may be used for training the machine learning model 402 is shown. The dataset 450 may include a column for a message ID 453 that is used to identify each data entry in the dataset 450. The dataset 450 may include a column for text 456 (e.g., the text of a message), a column for a timestamp 459 (e.g., indicating when the message was sent or received), a column for an urgency level 462 (e.g., as generated by the urgency detection model discussed above), a column for a sentiment identifier 465 (e.g., as generated by the sentiment detection model discussed above), and a column for a predicted response time 468 (e.g., the time that a user actually responded to the message identified by the message ID). The columns 456-465 may be used as features and the predicted response time column 468 may be used as labels for training a supervised machine learning model (e.g., the model 402).

Figure 5:
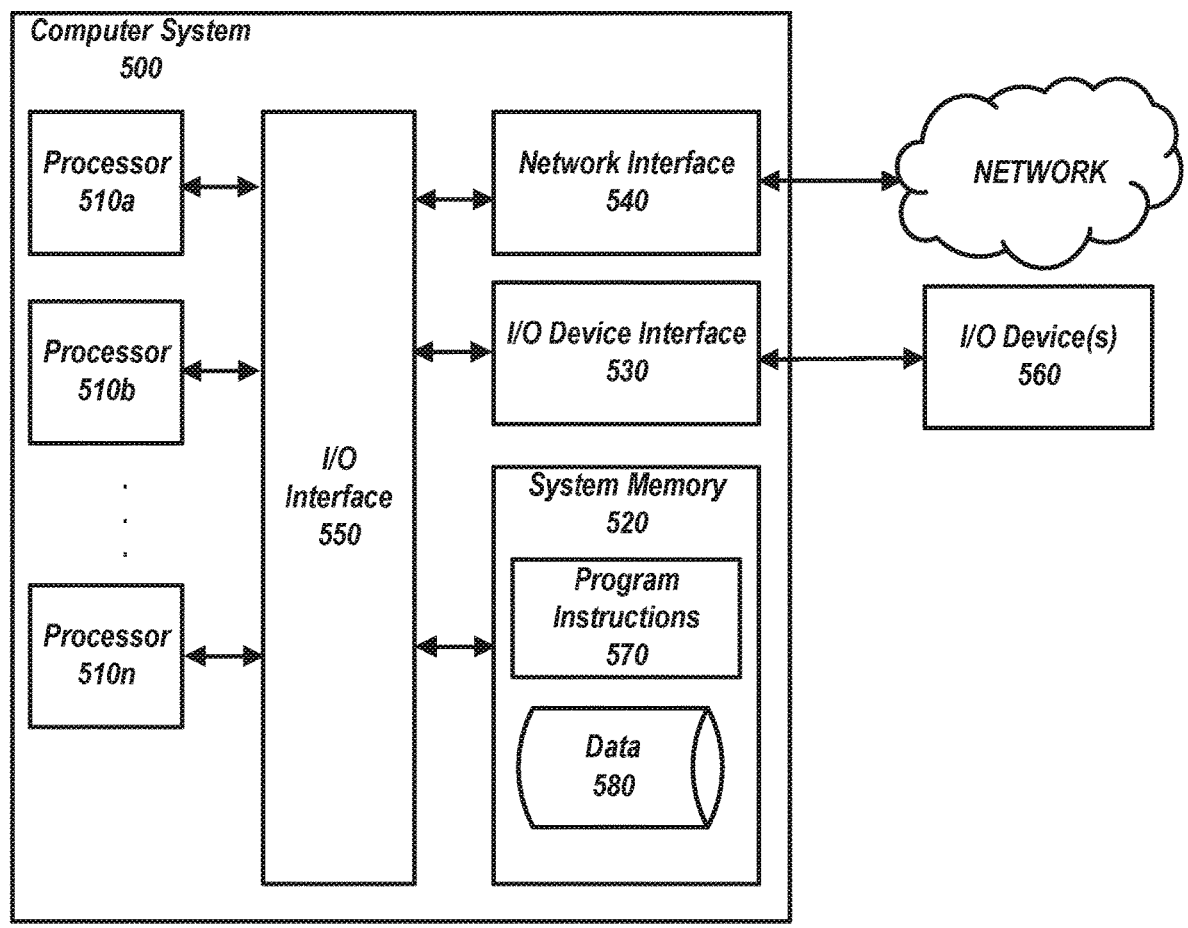
FIG. 5 shows an example computing system that may be used to determine a time to send a notification, in accordance with some embodiments.

FIG. 5 is a diagram that illustrates an exemplary computing system 500 in accordance with embodiments of the present technique. Various portions of systems and methods described herein, may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a units-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computing system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computing system 500 through a wired or wireless connection. 110 devices 560 may be connected to computing system 500 from a remote location. I/O devices 560 located on remote computer system, for example, may be connected to computing system 500 via a network and network interface 540.

Network interface 540 may include a network adapter that provides for connection of computing system 500 to a network. Network interface 540 may facilitate data exchange between computing system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 500 or multiple computer systems 500 configured to host different portions or instances of embodiments. Multiple computer systems 500 may provide for parallel or sequential processing/execution of one or more portions of the techniques described herein.

Those skilled in the art will appreciate that computing system 500 is merely illustrative and is not intended to limit the scope of the techniques described herein. Computing system 500 may include any combination of devices or software that may perform or otherwise provide for the performance of the techniques described herein. For example, computing system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 500 may be transmitted to computing system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 6:
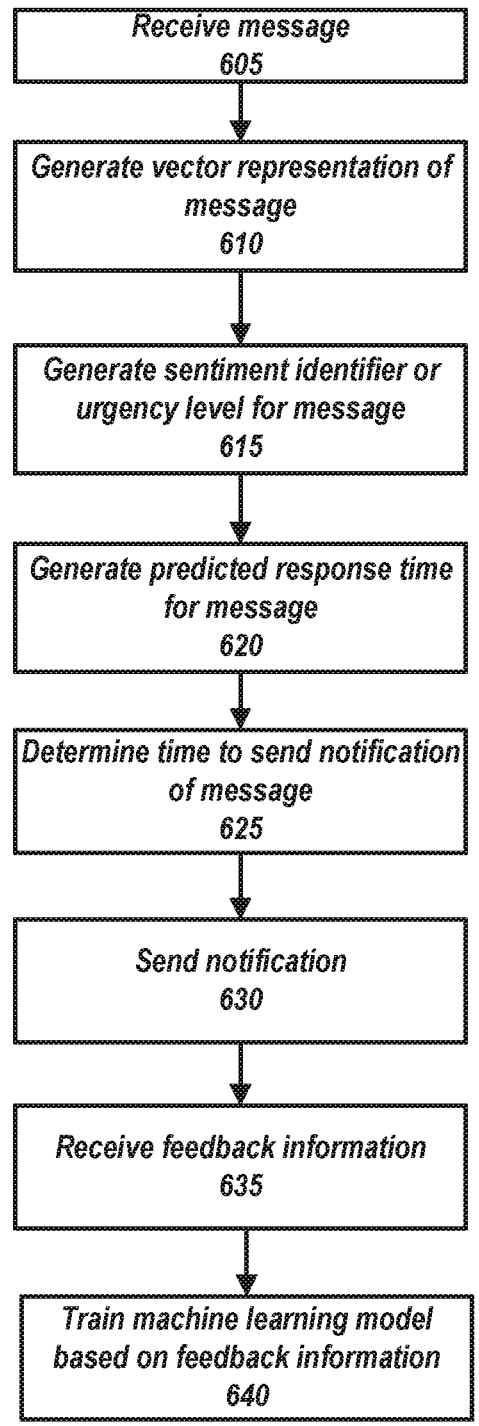
FIG. 6 shows an example flowchart of the actions involved in using machine learning for notifications, in accordance with some embodiments.

FIG. 6 shows an example flowchart of the actions involved in using machine learning to determine when to provide a notification. For example, process 600 may represent the actions taken by one or more devices shown in FIGS. 1-5 and described above. At 605, notification system 102 using one or more components in system 100 (FIG. 1) and/or computing system 500 via network interface 540 (FIG. 5)) receives a message. The message may comprise text and metadata indicating a sender of the message, the user device intended to receive the message, and/or a timestamp.

At 610, notification system 102 (e.g., using one or more components in system 100 (FIG. 1) and/or computing system 500 via one or more processors 510a-510n and system memory 520 (FIG. 5)) generates a vector representation of the message. The vector representation may be generated via a message embedding model. The vector representation may be indicative of the text and the metadata of the message.

At 615, notification system 102 (e.g., using one or more components in system 100 (FIG. 1) and/or computing system 500 via one or more processors 510a-510n, I/O interface 550, and/or system memory 520 (FIG. 5)) generates a sentiment identifier and/or an urgency level for the message. The notification system 102 may input the vector representation into a sentiment detection model to obtain a sentiment identifier associated with the message. The notification system 102 may input the vector representation into an urgency detection model to obtain an urgency level associated with the message.

At 620, notification system 102 (e.g., using one or more components in system 100 (FIG. 1) and/or computing system 500 via one or more processors 510a-510n (FIG. 5)) generates a predicted response time for the message. The notification system 102 may input an indication of the sentiment identifier, the urgency level, the timestamp, and/or the user device information into a response prediction model to obtain a predicted response time for the message. The predicted response time may indicate a quantity of time predicted to transpire between a first time at which the notification is received at the user device and a second time at which a response to the message is predicted to be sent.

At 625, notification system 102 (e.g., using one or more components in system 100 (FIG. 1) and/or computing system 500 (FIG. 5)) determines a time to provide the notification for the message. The notification system 102 may determine, based on a comparison of the predicted response time with each threshold of a plurality of thresholds, a time to provide the message notification to the user device.

At 630, notification system 102 (e.g., using one or more components in system 100 (FIG. 1) and/or computing system 500 via the network interface 540 (FIG. 5)) provides, based on the determined time, the notification to the user device.

At 635, notification system 102 (e.g., using one or more components in system 100 (FIG. 1) and/or computing system 500 via one or more processors 510a-510n (FIG. 5)) receives, from the user device, feedback information indicating a preferred time for receiving the message notification and a second sentiment identifier of the message indicating an interpretation of the message by the user.

At 640, notification system 102 (e.g., using one or more components in system 100 (FIG. 1) and/or computing system 500 via one or more processors 510a-510n (FIG. 5)) trains, based on the feedback information, the sentiment detection model, the urgency detection model, and/or the response prediction model.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or equipment discussed in relation to FIGS. 1-5 could be used to perform one or more of the actions in FIG. 6.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" used in a permissive sense meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Further more, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising receiving a message; generating, via a model, an urgency level associated with the message; inputting an indication of the urgency level, into the model to obtain a predicted response time for the message; determining, based on a comparison of the predicted response time with a threshold, a time to provide a message notification to the user device; and providing, based on the determined time, the notification to the user device.

2. The method of any of the preceding embodiments, wherein the generating an urgency level comprises: generating a vector representation of the message, wherein the vector representation is indicative of the text and the metadata of the message; inputting the vector representation into a sentiment detection model to obtain a sentiment identifier associated with the message; and inputting the vector representation into an urgency detection model to obtain an urgency level associated with the message.

3. The method of any of the preceding embodiments, wherein the predicted response time for the message is indicative of a quantity of time predicted to transpire between a first time at which the notification is received at the user device and a second time at which a response is predicted to be sent to the message.

4. The method of any of the preceding embodiments, further comprising:
receiving, from the user device, feedback information indicating a preferred time for receiving the message notification and a second sentiment identifier of the message indicating an interpretation of the message by the user; and training, based on the feedback information, the model.

5. The method of any of the preceding embodiments, wherein the determining a time to provide the message notification to the user device further comprises: determining, for a first time period, a first sentiment identifier predicted to correspond to a response from the user device, if the notification is sent during the first time period; and based on a determination that the sentiment identifier matches a target sentiment identifier, determining the time to provide the message notification based on the first time period.

6. The method of any of the preceding embodiments, wherein the determining a time to provide the message notification to the user device comprises: comparing the predicted response time with a first threshold of a plurality thresholds; and based on a determination that the predicted response time fails to satisfy the first threshold, determining the time to provide the message notification based on a user preference, wherein the user preference indicates a time at which non-urgent message notifications should be sent.

7. The method of any of the preceding embodiments, wherein the user device information comprises schedule information associated with a user of the user device, the schedule information indicating a time when the user is available.

8. The method of any of the preceding embodiments, wherein the information indicating a preferred time comprises a timestamp indicating a time at which a response to the message was sent.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A system for using machine learning to determine a time to send a message notification to a user device, the system comprising:
one or more processors configured to execute computer program instructions that, when executed, cause the one or more processors to perform operations comprising:
receiving a message comprising text and metadata indicating a sender of the message, the user device intended to receive the message, and a timestamp;
generating, via a message embedding model, a vector representation of the message, wherein the vector representation is indicative of the text and the metadata of the message;
inputting the vector representation into a sentiment detection model to obtain a sentiment identifier associated with the message;
inputting the vector representation into an urgency detection model to obtain an urgency level associated with the message;
inputting an indication of the sentiment identifier, the urgency level, the timestamp, and user device information into a response prediction model to obtain a predicted response time for the message indicative of a quantity of time predicted to transpire between a first time at which the notification is received at the user device and a second time at which a response to the message is predicted to be sent;
determining, based on a comparison of the predicted response time with each threshold of a plurality of thresholds, a time to send the message notification to the user device;
sending, based on the determined time, the notification to the user device;
receiving, from the user device, feedback information indicating a preferred time for receiving the message notification and a second sentiment identifier of the message indicating an interpretation of the message by the user; and
training, based on the feedback information, the sentiment detection model, the urgency detection model, and the response prediction model.

2. The system of claim 1, wherein the determining a time to send the message notification to the user device further comprises:
determining, for a first time period, a first sentiment identifier predicted to correspond to a response from the user device, if the notification is sent during the first time period; and
based on a determination that the sentiment identifier matches a target sentiment identifier, determining the time to send the message notification based on the first time period.

3. The system of claim 1, wherein the determining a time to send the message notification to the user device comprises:
comparing the predicted response time with a first threshold of the plurality of thresholds; and
based on a determination that the predicted response time fails to satisfy the first threshold, determining the time to send the message notification based on a user preference, wherein the user preference indicates a time at which non-urgent message notifications should be sent.

4. The system of claim 1, wherein the user device information comprises schedule information associated with a user of the user device, the schedule information indicating a time when the user is available.

5. A method for using machine learning to determine times to send message notifications to user devices comprising:
receiving a message comprising text and metadata indicating a sender of the message, a user device intended to receive the message, and a timestamp;
generating, via one or more machine learning models, a sentiment identifier and an urgency level associated with the message, wherein the generating a sentiment identifier and an urgency level comprises:

generating a vector representation of the message, wherein the vector representation is indicative of the text and the metadata of the message;

inputting the vector representation into a sentiment detection model to obtain the sentiment identifier associated with the message; and inputting the vector representation into an urgency detection model to obtain an urgency level associated with the message;

inputting an indication of the sentiment identifier, the urgency level, the timestamp, and user device information into a response prediction model to obtain a predicted response time for the message;

determining, based on a comparison of the predicted response time with each threshold of a plurality of thresholds, a time to provide a message notification to a user; and providing, based on the determined time, the notification to the user.

6. The method of claim 5, wherein the predicted response time for the message is indicative of a quantity of time predicted to transpire between a first time at which the notification is received at the user device and a second time at which a response is predicted to be sent to the message.

7. The method of claim 5, further comprising:

receiving, from the user device, feedback information indicating a preferred time for receiving the message notification and a second sentiment identifier of the message indicating an interpretation of the message by the user; and training, based on the feedback information, the one or more machine learning models.

8. The method of claim 5, wherein the determining a time to send the message notification to the user device further comprises:

determining, for a first time period, a first sentiment identifier predicted to correspond to a response from the user device, if the notification is sent during the first time period; and based on a determination that the sentiment identifier matches a target sentiment identifier, determining the time to send the message notification based on the first time period.

9. The method of claim 5, wherein the determining a time to send the message notification to the user device comprises:

comparing the predicted response time with a first threshold of the plurality of thresholds; and based on a determination that the predicted response time fails to satisfy the first threshold, determining the time to send the message notification based on a user preference, wherein the user preference indicates a time at which non-urgent message notifications should be sent.

10. The method of claim 5, wherein the user device information comprises schedule information associated with a user of the user device, the schedule information indicating a time when the user is available.

11. The method of claim 5, wherein the information indicating a preferred time comprises a timestamp indicating a time at which a response to the message was sent.

12. A tangible, non-transitory, machine-readable medium storing instructions that when executed by one or more processors effectuate operations comprising:

receiving a message, comprising text and metadata indicating a sender of the message, a user intended to receive the message, and a timestamp;

generating, via one or more machine learning models, a sentiment identifier and an urgency level associated with the message, wherein the generating a sentiment identifier and an urgency level comprises:

generating a vector representation of the message, wherein the vector representation is indicative of the text and the metadata of the message;

inputting the vector representation into a sentiment detection model to obtain the sentiment identifier associated with the message; and inputting the vector representation into an urgency detection model to obtain an urgency level associated with the message;

inputting an indication of the sentiment identifier, the urgency level, the timestamp, and user device information into a response prediction model to obtain a predicted response time for the message;

determining, based on a comparison of the predicted response time with each threshold of a plurality of thresholds, a time to provide a message notification to a user; and providing, based on the determined time, the notification to a user.

13. The medium of claim 12, wherein the predicted response time for the message is indicative of a quantity of time predicted to transpire between a first time at which the notification is received at the user device and a second time at which a response is predicted to be sent to the message.

14. The medium of claim 12, wherein the instructions, when executed by the one or more processors, further effectuate operations comprising:

receiving, from the user device, feedback information indicating a preferred time for receiving the message notification and a second sentiment identifier of the message indicating an interpretation of the message by the user; and training, based on the feedback information, the one or more machine learning models.

15. The medium of claim 12, wherein the instructions for determining a time to send the message notification to the user device, when executed by the one or more processors, further effectuate operations comprising:

determining, for a first time period, a first sentiment identifier predicted to correspond to a response from the user device, if the notification is sent during the first time period; and based on a determination that the sentiment identifier matches a target sentiment identifier, determining the time to send the message notification based on the first time period.

16. The medium of claim 12, wherein the instructions for determining a time to send the message notification to the user device comprises, when executed by the one or more processors, further effectuate operations comprising:

comparing the predicted response time with a first threshold of the plurality of thresholds; and based on a determination that the predicted response time fails to satisfy the first threshold, determining the time to send the message notification based on a user preference, wherein the user preference indicates a time at which non-urgent message notifications should be sent.

17. The medium of claim 12, wherein the user device information comprises schedule information associated with a user of the user device, the schedule information indicating a time when the user is available.

18. The medium of claim 12, wherein the information indicating a preferred time comprises a timestamp indicating a time at which a response to the message was sent.

* * * * *